United States Patent [19]

Intriligator

[11] Patent Number: 6,163,323
[45] Date of Patent: Dec. 19, 2000

[54] SELF-SYNCHRONIZING ANIMATIONS

[76] Inventor: James Matthew Intriligator, 67 Cleveland St., Arlington, Mass. 02174

[21] Appl. No.: 09/054,553

[22] Filed: Apr. 3, 1998

[51] Int. Cl.[7] .................................................. G06T 13/00
[52] U.S. Cl. .......................... 345/473; 345/435; 345/432
[58] Field of Search ...................................... 345/473, 475

[56] References Cited

U.S. PATENT DOCUMENTS 3,572,915  3/1971  Butterfield .................................. 352/1

OTHER PUBLICATIONS

Chang et al. "Animation: From Cartoons to the User Interface." Proceedings of UIST'93. ACM. Nov. 3–5, 1993.

*Primary Examiner*—Mark Zimmerman
*Assistant Examiner*—Philip Stevenson
*Attorney, Agent, or Firm*—Fish & Richardson P.C.

[57] ABSTRACT

In a video generation system having a digital image presented on a visual output medium, a method for generating animations includes repeatedly partially dissolving a first replacement set of image values, representing at least one edge, into the digital image and, while the first set of image values is only partially dissolved into the digital image, at least partially dissolving a second replacement set of images values, representing at least one edge distinct from the edge represented by the first replacement set of values, into the digital image.

19 Claims, 10 Drawing Sheets

110

| Index | R | G | B |
|---|---|---|---|
| 165 → 0 | 5 | 7 | 3 |
| 165 → 1 | 1 | 18 | 35 |
| 165 → 2 | 56 | 5 | 42 |
| 165 → 3 | 97 | 2 | 158 |
| ⋮ | ⋮ | ⋮ | ⋮ |
| 165 → 255 | 89 | 0 | 172 |

FIG. 4

SELF-SYNCHRONIZING ANIMATIONS

BACKGROUND OF THE INVENTION

1. Field of the Invention

The present invention relates generally to a method and apparatus for producing animations and, more particularly, is directed at producing animations which appear to synchronize with a wide array of rhythmic patterns.

2. Edge Detection in the Human Visual System

Vision researchers have long known that the human visual system includes mechanisms specially adapted to detect edges (i.e. sharp transitions between relatively homogenous regions) in a visual field. The human visual system will sense motion in a visual field when the shape or configuration of edges within the field changes. Experiments demonstrating the edge detecting capabilities of the human visual system are described in numerous scientific publications.

It is also known that the human visual system is capable of detecting edges even in the presence of visual noise. That is, the human visual system may detect edges in a visual field even if the edges are, for example, poorly defined or partially obliterated.

A visual field may, however, contain an edge which is so poorly defined that the edge will not initially be perceived by a human observer. Nonetheless, the same observer may suddenly perceive the edge if, for example, the edge is pointed out to the observer, or if the observer's attention is otherwise focused on the edge. Conversely, such an edge may seem to disappear from the visual field if the observer is distracted or otherwise focused away from the edge. Such edges in a visual field will be referred to as "latent edges."

3. Computer Animation

Modern computer graphics systems typically include a central processing unit (CPU), an image memory which is mapped by hardware locations onto an output display device, and a color map, which provides a correspondence between a given value stored in the image memory and the resulting color and intensity of the corresponding pixel in the output device. Computer graphics systems may be used to create animations by programming the central processing unit to repeatedly change the values stored in the image memory or in the color map, so as to produce a rapidly changing sequence of edges. For example, the central processing unit may be programmed to repeatedly substitute a pre-existing sequence of "frames" of an animation into the image memory. Alternatively, the central processing unit may be programmed to modify the values in the image memory according to a mathematical formula. Rapid changes in the color map may also produce the illusion of dynamic motion in the displayed image.

When animations are created to accompany music or other rhythmic patterns, they are typically hand-crafted. In other words, it is usually necessary for a human operator to painstakingly "key" visual events (corresponding, for example, to the creation of a new edge or repositioning of a set of edges in the displayed image) to rhythmic events (such as crescendos or drum beats). This keying usually involves the creation of new visual material to correspond to particular rhythmic events. In other cases, rather than creating new material, it is possible to alter the time-course of an existing animated sequence to create a tighter synchronization between the sequence and a stream of rhythmic events.

Referring to FIG. 1, manual event keying an animation to, for example, a musical sequence requires a human listener to subjectively interpret an auditory stream 11 (shown as a graph of sound intensity as a function of time) as a series of auditory events 12, and to program a series of visual events 13 which correspond in time with those auditory events 12. As can be seen, there is no obvious way to identify any auditory event such as a drum beat 14, or a harp chord 15, simply by mechanically analyzing the shape of the corresponding auditory stream 11. Thus, to create the series of visual events 13, a human listener must listen to auditory stream 11 and record the relative times of subjective auditory events 12. After these auditory events have been identified, an artist creates a series of visual events 13 at appropriate times to correspond to auditory events 12. When this series of visual events 13 is later displayed in synchronization with auditory stream 11, the observer will perceive visual events occurring in-time to the music. Notice that time-consuming human decisions are necessary at several stages of this process.

Previous attempts to automate this process have primarily focused on creating devices (hardware and/or software) that can automatically parse the auditory stream 11 into a stream of auditory events 12 and thereby eliminate the first tedious step. Such techniques can, however, be quite slow and variable in their results.

SUMMARY OF THE INVENTION

It is therefore an object of the present invention to provide a method and apparatus for creating animations that appear to self-synchronize with a rhythmic stream without the need to parse the rhythmic stream into rhythmic events.

In one aspect, the invention provides, in a video generation system having a digital image presented on a visual output medium, a method for generating animations which includes repeatedly partially dissolving a first replacement set of image values, representing at least one edge, into the digital image and, while the first set of image values is only partially dissolved into the digital image, at least partially dissolving a second replacement set of images values, representing at least one edge distinct from the edge represented by the first replacement set of values, into the digital image.

BRIEF DESCRIPTION OF THE DRAWINGS

FIG. 4 shows schematically a color map.

DESCRIPTION OF THE PREFERRED EMBODIMENTS

The present invention is directed to a method and apparatus for creating animations which appear to self-synchronize with auditory streams. In particular, the invention is directed at a method and apparatus for creating, on a visual output medium, an animated image in which latent edges having varying degrees of definition are continuously generated. A significant portion of the latent edges present in the image at any given time are sufficiently ill-defined so that they appear hidden to a human observer until an external cue, such as an auditory event, causes the observer's attention to focus on the presence of the edge. Other latent edges in the image which are apparent to a human observer will be sufficiently poorly defined that they seem to disappear if the observer's attention or gaze shifts in response to a stimulus. In the presence of a rhythmic stream, for example music, latent edges in the image will seem to a human observer to appear and disappear in synchronization with the stream.

Latent edges are generated by combining two or more distinct digital images into a single composite image, using a weighting function in which the weight assigned to each image changes over time. As the relative weight assigned to a given digital image increases or decreases over time, the edges contained within that image become more or less well defined in the composite image, and thus become more or less likely to be perceived by a human observer.

Figure 1:
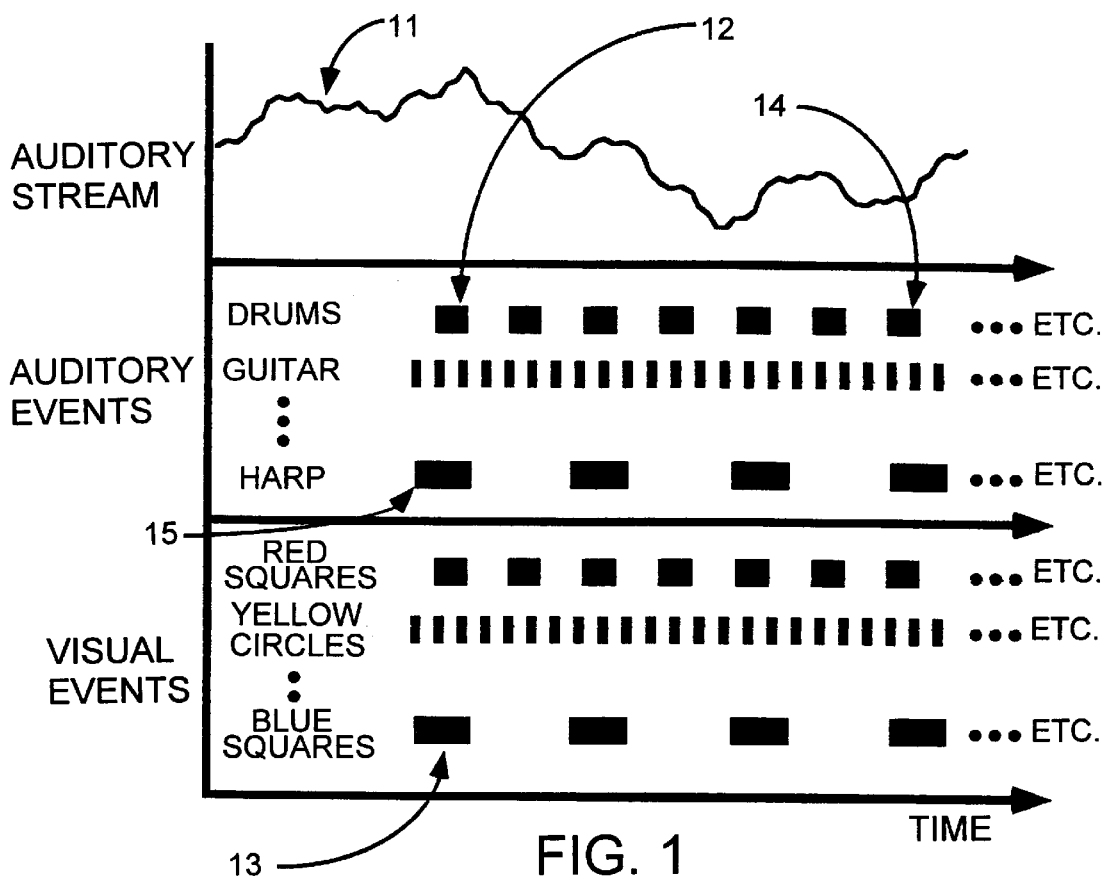
FIG. 1 shows schematically the auditory events in an auditory stream, and visual events keyed to the auditory events.
Figure 2:
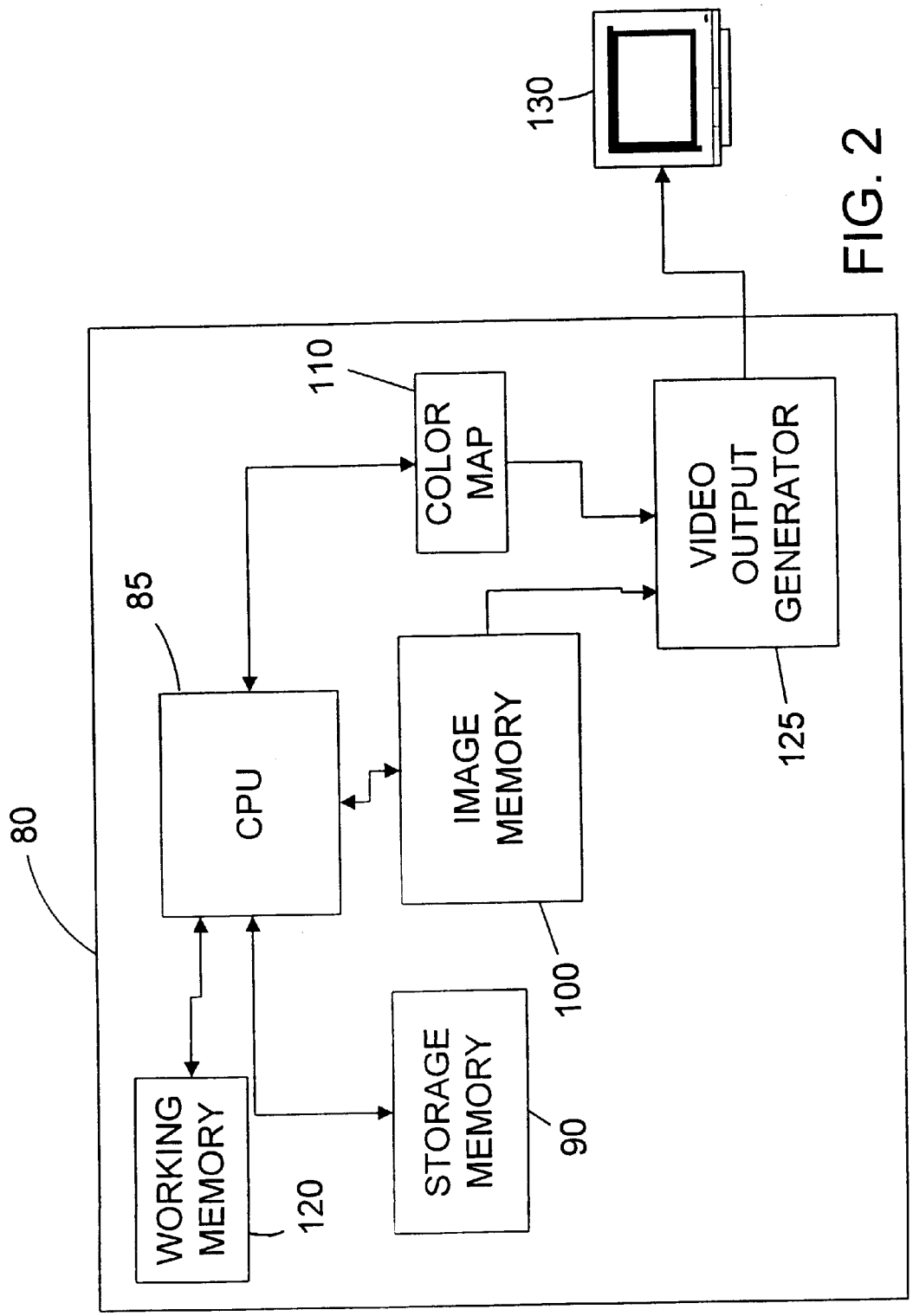
FIG. 2 shows schematically a computer system capable of displaying digitized images.

Referring to FIG. 2, a computerized digital image display system 80 (for example, a Power Macintosh 8600/250 with a 256 color monitor with a 60 hertz refresh rate) includes a central processing unit (CPU) 85, a storage memory 90 (such as a magnetic disk, CDROM or large RAM memory), a bit-mapped image memory 100, a color map 110, a working memory 120, and a video output generator 125, and a video display mechanism 130 (such as a monitor or video recorder). The CPU is capable of reading image files from storage memory 90, and is capable of writing values to image memory 100 and color map 110. The video output generator 125 is capable of reading values from the image memory 100 and the color map 110 and generating video signals to the video display 130.

Figure 3:
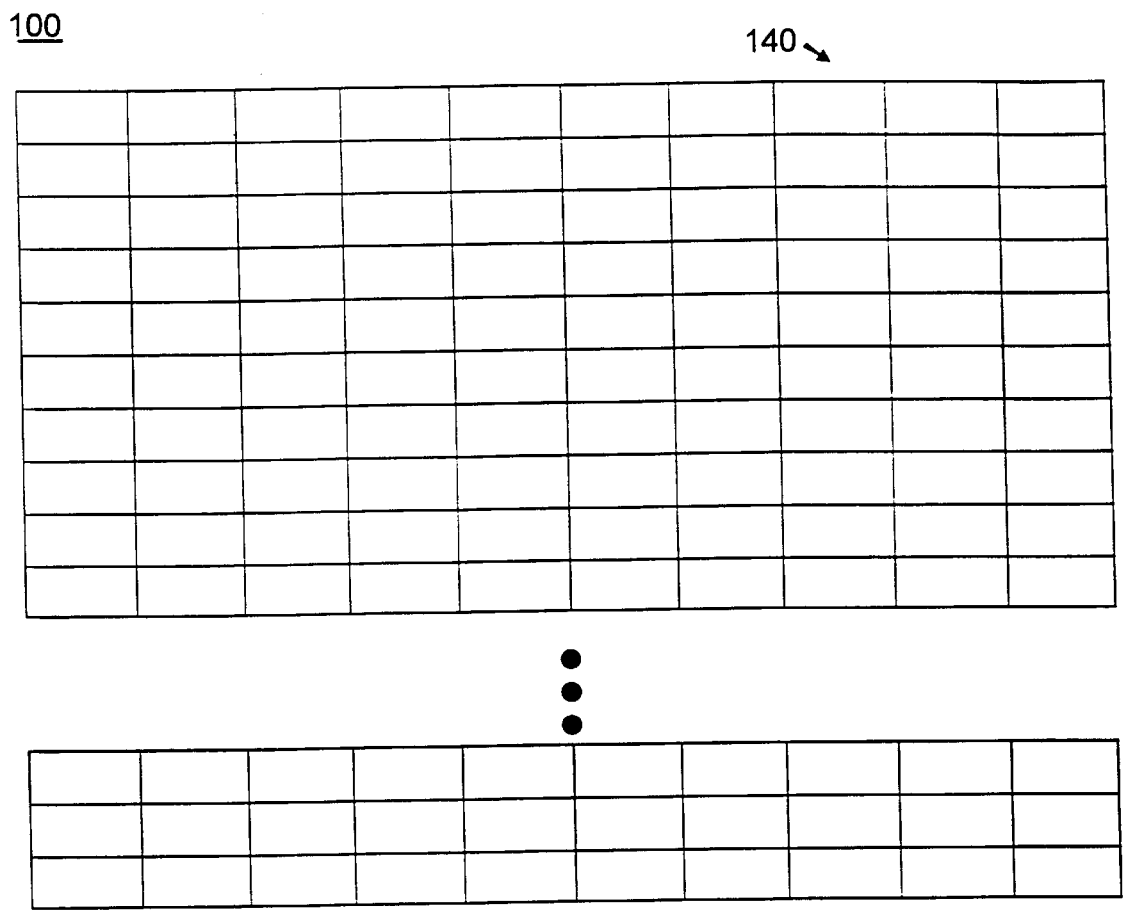
FIG. 3 shows schematically an image memory.

Referring to FIG. 3, the image memory 100 includes an array of image memory elements 140, each corresponding to an image pixel displayed by the video display 130. In a preferred embodiment, each image memory element 140 can hold a value from 0 to 255 inclusive. In a preferred embodiment, the video display 130 is capable of displaying a grid of 640×480 pixels, and the image memory 100 therefore contains 307200 image memory elements 140, each corresponding to one pixel on the output device.

Figure 5:
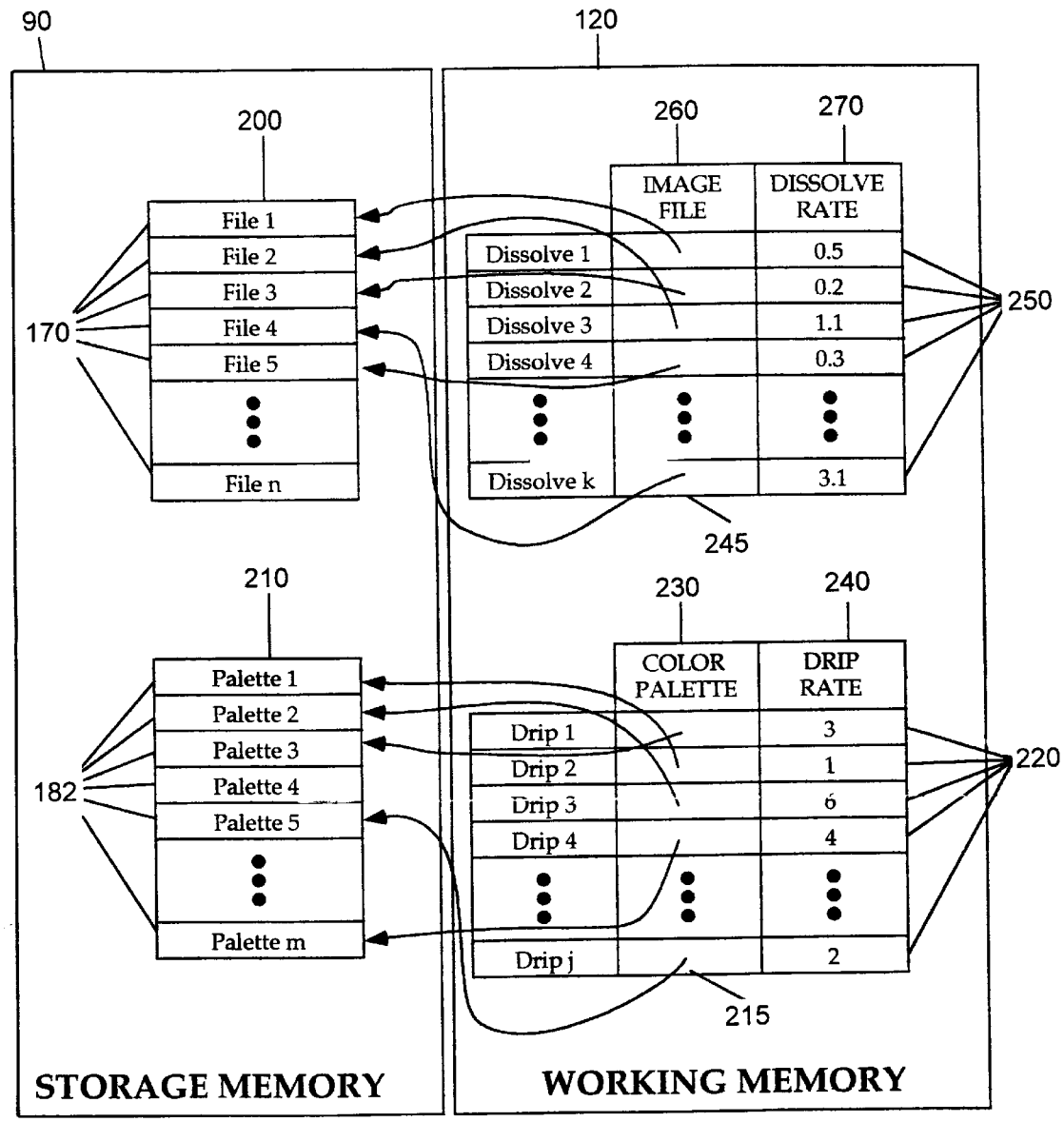
FIG. 5 shows schematically certain data structures used in an embodiment of the invention.

Referring to FIG. 4, color map 110 is an array of 256 color map translation vectors 165. Each color map translation vector 165 in the color map 110 includes an index value, and intensity values R, G, and B, corresponding to intensities of red, green and blue light. The color map 110 includes a translation vector having an index value corresponding to each of the possible values stored in an image memory element 140. Thus, in the case of an image memory whose elements can hold values from 0 to 255, the color map will have a color map translation vector with an index corresponding to each value within that range. (The embodiment described here uses the RGB system for describing the appearance of pixels in the video display 130. However, alternative embodiments may utilize other systems for representing color or grey scale values in numerical form.) Referring now to FIG. 5, storage memory 90 includes an image file array 200 containing multiple image files 170. In a preferred embodiment, each of the image files 170 contains elements representing an image which, when loaded into the image memory and displayed on the video display 130, includes edges which are discernable to a human viewer.

Each image file includes a sequence of data elements, each corresponding to a particular element 140 of the image memory 100. Storage memory 90 also includes a color palette array 210, which includes a plurality of color palettes 182. Each color palette 182 includes a set of vectors which may be loaded into the color map 110 to create a distinct mapping between image memory element values and pixel colors. In a preferred embodiment, both image file array 200 and color palette array 210 each have at least three distinct entries.

For best results, all of the color palettes are created such that no transition between any two successive palette vectors having successive index values is particularly large. Examples of preferred color palettes include sine-wave modulations of luminance, sine-wave modulations of hue, and any configurations reflecting smoothly modulating hue, saturation, or luminance values.

Working memory 120 includes an array 215 of DRIP data structures 220. Each DRIP data structure 220 includes fields COLOR_PALETTE 230, which points to a color palette 182 in the color palette array 210, and DRIP_RATE 240, which is a percentage value between 0 and 100.

Working memory 120 also includes an array 245 of DISSOLVE data structures 250. Each DISSOLVE data structure includes fields IMAGE_FILE 260, which points to an image file 170 in the image file array 200, and DISSOLVE_RATE 270, which is a percentage value between 0 and 100.

Figure 6:
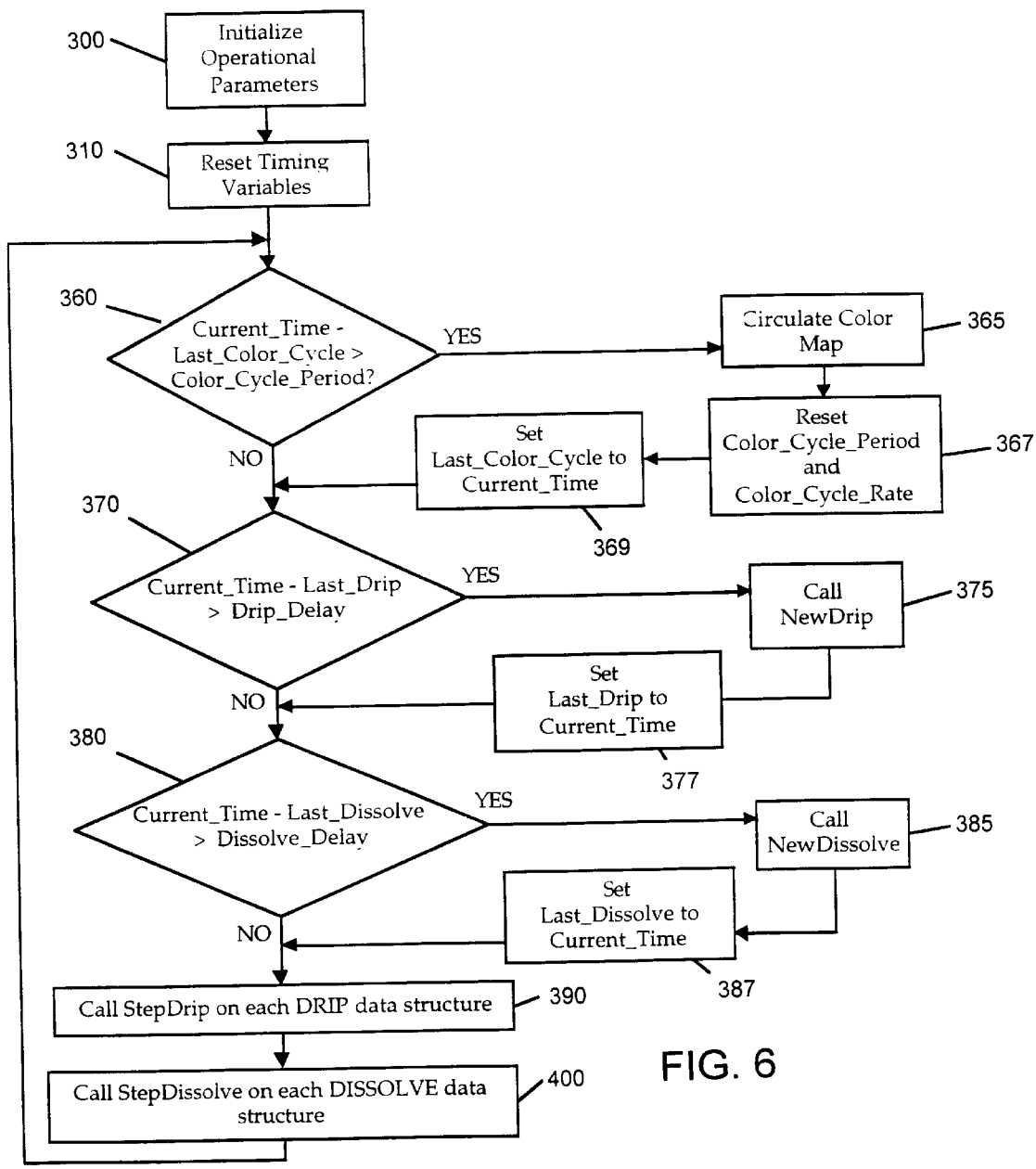
FIG. 6 shows the overall steps taken by an embodiment of the invention.

Referring now to FIG. 6, a preferred embodiment begins by first initializing the operational parameters COLOR_CYCLE_RATE, COLOR_CYCLE_PERIOD, DRIP_DELAY and DISSOLVE_DELAY (step 300). The significance of these parameters is discussed in more detail below. The selection may be done randomly, or may be determined by external data, such as user input, or a preprogrammed file of instructions.

Next, timing variables LAST_COLOR_CYCLE, LAST_DRIP and LAST_DISSOLVE are each initialized to zero (step 310).

Once the operational parameters have been set and the timing variables have been initialized, the central processing unit begins executing an infinite loop. First, the current time is compared with the value of LAST_COLOR_CYCLE (step 360). If the difference is greater than COLOR_CYCLE_PERIOD, the color map index values within the color map 110 are circulated by COLOR_CYCLE_RATE positions (step 365). By "circulated" it is meant that the R, G and B values associated with each index value are shifted to be associated with a new index value equal to the old index value plus COLOR_CYCLE_RATE, modulo the total number of indices stored in the color map. Next, new values are selected for the parameters COLOR_CYCLE_PERIOD and COLOR_CYCLE_RATE (step 367). The selection may be done randomly, or may be determined by external data, such as user input, or a preprogrammed file of instructions. Then LAST_COLOR_CYCLE is set equal to the current time (step 369).

Next, the current time is compared to the value of LAST_DRIP (step 370). If the difference is greater than DRIP_DELAY, then the routine NewDrip is called (step 375). As explained in more detail below, NewDrip will create a new DRIP data structure and place it on the previously mentioned array of DRIP data structures. LAST_DRIP is then set equal to the current time (step 377).

Next, the current time is compared to the value of LAST_DISSOLVE (step 380). If the difference is greater than DISSOLVE_DELAY, then the routine NewDissolve is called (step 385). As explained in more detail below, NewDissolve will create a new DISSOLVE data structure and place it on the previously mentioned array of DISSOLVE data structures. LAST_DISSOLVE is then set equal to the current time (step 387).

Next, and referring now to FIGS. 5 and 6, for every DRIP data structure 220 in array 215, the routine StepDrip is called (step 390). Then, for every DISSOLVE data structure 250 in array 245, the routine StepDissolve is called (step 400). Control then returns to step 360.

Figure 7:
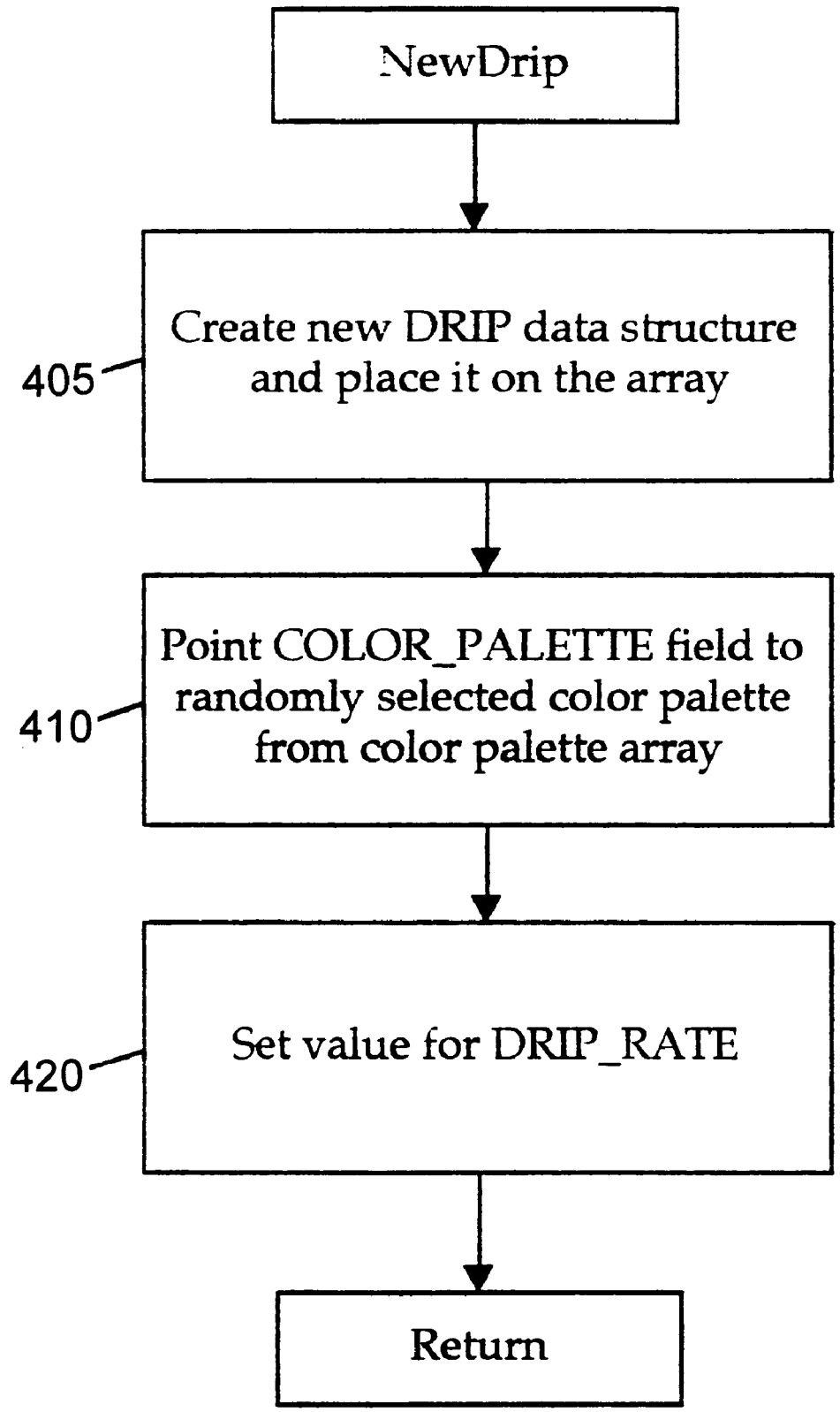
FIG. 7 shows the steps taken by the routine NewDrip in an embodiment of the invention.

Referring now to FIGS. 5 and 7, the routine NewDrip operates as follows. A new DRIP data structure 220 is created and placed in array 215 (step 405). Within the DRIP data structure 220, the field COLOR_PALETTE 230 is loaded with a pointer to a color palette 182 selected from those in color palette array 210 (step 410). The selection may be done randomly, or may be determined by external data, such as user input, or a preprogrammed file of instructions. A value is then selected for the field DRIP_RATE 240 (step 420). The value of DRIP_RATE may be set between 0 and 100%. The selection of DRIP_RATE may be done randomly, or may be determined by external data, such as user input, or a preprogrammed file of instructions.

Figure 8:
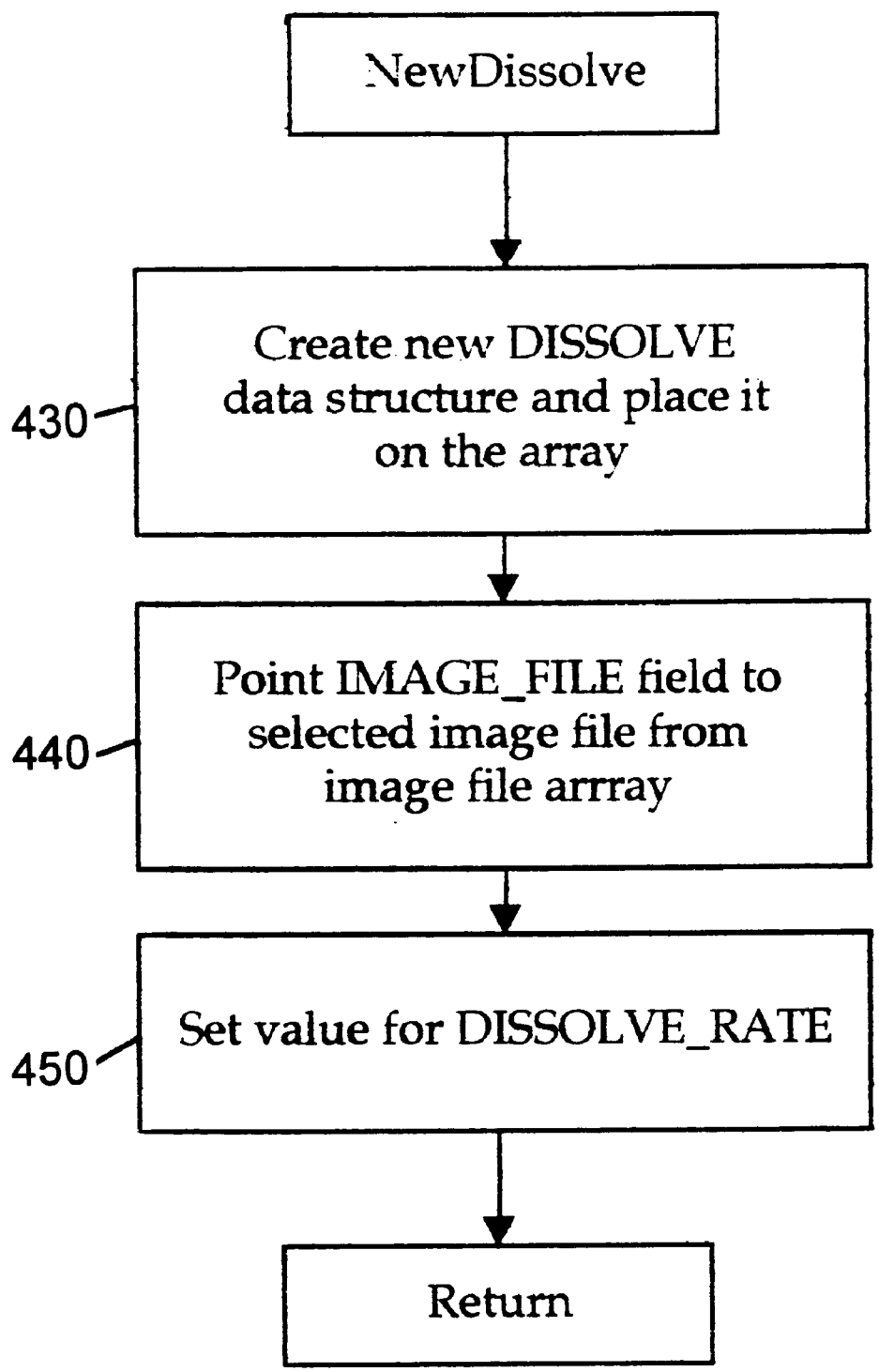
FIG. 8 shows the steps taken by the routine NewDissolve in an embodiment of the invention.

Referring to FIGS. 5 and 8, the routine NewDissolve operates as follows. A new DISSOLVE data structure 250 is created and placed in array 245 (step 430). Within the data structure 250 the field IMAGE_FILE 260 is loaded with a pointer to an image file 170 selected from those in the image file array 200 (step 440). The selection may be done randomly, or may be determined by external data, such as user input, or a preprogrammed file of instructions. A value is then selected for the field DISSOLVE_RATE 270 (step 450). The value of DISSOLVE_RATE may be set between 0 and 100%. The selection may be done randomly, or may be determined by external data, such as user input, or a preprogrammed file of instructions.

Figure 9:
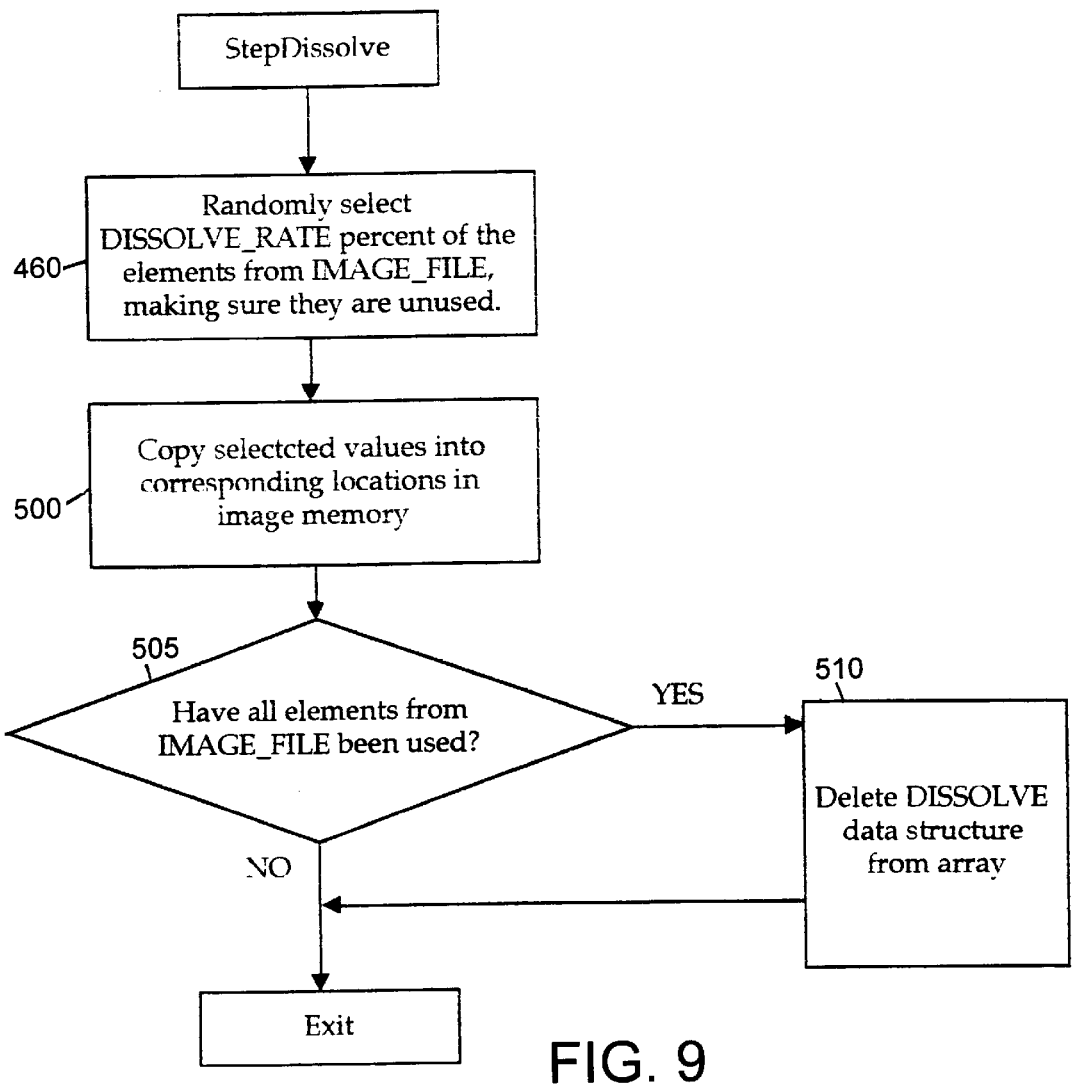
FIG. 9 shows the steps taken by the routine StepDissolve in an embodiment of the invention.

Referring to FIGS. 5 and 9, the routine StepDissolve is applied to a given DISSOLVE data structure as follows. First, a number of unused image file elements 140 from IMAGE_FILE, are randomly selected (step 460). An image file element is unused if it has not previously been randomly selected in connection with a call to StepDissolve involving the instant DISSOLVE data structure. The percentage of all image file elements selected in each call to StepDissolve is determined by the value of the field DISSOLVE_RATE 270. The values from each of the selected image file elements 175 are then copied into the corresponding elements of image memory 100 (step 500). Next, it is determined whether all of the elements in IMAGE_FILE have been used (step 505). If so, the DISSOLVE data structure is deleted from array 245 (step 510).

Figure 10:
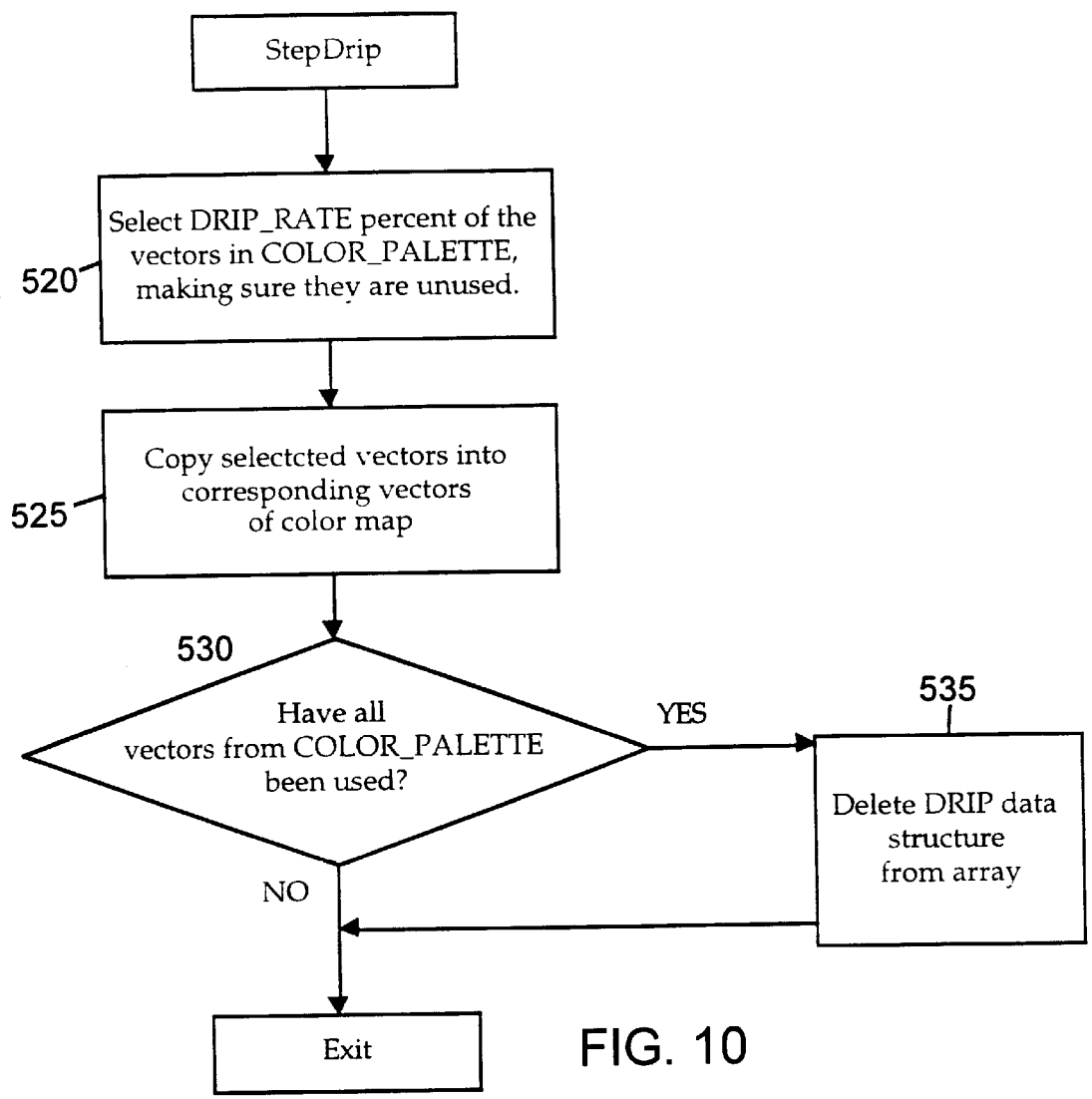
FIG. 10 shows the steps taken by the routine StepDrip in an embodiment of the invention.

Referring to FIGS. 5 and 10, the routine StepDrip is applied to a given DRIP data structure as follows. First, a number of unused vectors from the color palette COLOR_PALETTE, are selected (step 520). This may be done randomly, however it has been found that selecting vectors from the palette sequentially gives the best results. A vector is unused if it has not previously been randomly selected in connection with a call to StepDrip involving the instant DRIP data structure. The percentage of all color palette vectors selected in each call to StepDrip is determined by the value of the field DRIP_RATE 240. The values from each of the selected vectors are then copied into the corresponding vectors of color map 110 (step 525). Next, it is determined whether all of the elements in COLOR_PALETTE have been used (step 530). If so, the DRIP data structure is deleted from array 215 (step 535).

By way of explanation, the foregoing steps work to create a dynamic composite image, rich with latent edges. Over time, the contribution of any given image to the resulting composite image will vary. Individual edges will seem to fade in and out as the image from which they are contributed is first dissolved into the composite image and then subsequently obscured by subsequently dissolved images. The color cycling and color palette dripping techniques described above serve to enhance this effect by altering the contrast between adjacent colored regions in the composite image, and also by increasing the variability of the dynamic composite image as individual images files are re-used over time, both of which increase the likelihood that latent edges will be produced in the image.

The images created using the method described above will appear to most users observers to be synchronized with auditory streams having a wide range of rhythms ordinarily found in recorded music, as well as other rhythmic patterns, such as a strobe light or a rhythmic massage.

Good results have been obtained by implementing the method in a program in the C programming language, running an executable file compiled from the C program using Symantec Think C on a Power Macintosh 8600/250, and displaying the output on a 256 color monitor with a refresh rate of 60 hertz. It has been found that best results are obtained when the values of DRIP_RATE result in an average of at least about ⅔ of the vectors in a color map being replaced in 1 second and when DRIP_DELAY is no greater than about 1.2 seconds. Similarly, it has been found that best results are obtained when the values of DISSOLVE_RATE result in an average of at least about ⅔ of image memory elements being modified in 1 second and when DISSOLVE_DELAY is not greater than approximately 1.2 seconds. In general, it has been found that best results are obtained when a given image file is no more than about 80% dissolved into the image memory before a second image file begins to be dissolved in the image memory.

In an alternative embodiment, the sequence of images generated by the method described above is written directly to a recording medium, such as a videotape, videodisc, computer disk, or DVD, for future playback.

In another alternative embodiment, the routine StepDissolve works as follows. Instead of substituting values from an image file into the image memory, StepDissolve generates, on each call, replacement values for randomly selected image memory elements. The replacement values are generated according to a function of the spatial location of each image memory element.

In another alternative embodiment, the routine StepDissolve works as follows. There is associated with each DISSOLVE data structure an additional field DISSOLVE_WEIGHT, which can hold a percentage value from 0 to 100%. Rather than simply being copied into the corresponding image memory location, each selected image file element is first multiplied by DISSOLVE_WEIGHT, while the value in the corresponding image memory location is multiplied by one minus DISSOLVE_WEIGHT. The two resulting values are then added together to create a weighted sum, which is then copied into the image memory element. The value of DISSOLVE_WEIGHT may be set randomly, or may be determined by external data, such as user input, or a preprogrammed file of instructions.

(It should be noted that in this embodiment, the apparent change in the visual appearance of the image memory is less sensitive to the dissolve rate than in the previously described embodiment because the influence of the image file elements being combined with the existing image memory elements is diluted when the value of DISSOLVE_WEIGHT is less than 100%. Accordingly, latent edges can be created using dissolve rates as high as 100% if the dissolve weight is appropriately chosen. Moreover, the dissolve may be acheived using a different set of contiguous image file elements in each call to StepDissolve, so that contiguous parts of the resulting image are effected by each call. In general, higher dissolve rates require lower dissolve weights to create an adequate number of latent edges.)

In another alternative embodiment, the routine StepDissolve may be modified to work as follows. On each call to StepDissolve, all or substantially all of the elements in IMAGE_FILE are combined with corresponding elements of the image memory using a weighted sum using DISSOLVE_WEIGHT as the weighting factor as previously described. The value of DISSOLVE_WEIGHT is then incremented by the value of DISSOLVE_RATE. If on any given call the value of DISSOLVE_WEIGHT reaches 100%, the DISSOLVE data structure is then deleted from array 245.

In general, the StepDissolve routine may be implemented by any mechanism for repeatedly replacing image memory element values with a combination of those values and values from an ordered set of replacement values representing at least one edge (for example image file elements from an image file), and by, in each repetition, gradually increasing the influence of the replacement set values in the combination relative to the image memory values (e.g. the percentage of image file elements replacing image memory elements or the weight applied to image file elements in a weighted sum of image file elements and image memory elements). In other words, repeated calls to StepDissolve must repeatedly change the values of the image memory so that the magnitude of the correlation between the values in image memory elements and the corresponding replacement set values increases over time.

Finally, in an alternative embodiment, the system may have no color map. In this case the image memory elements are mapped directly to the output device and do not go through the intermediate step of color map indexing.

Having described preferred embodiments of the invention with reference to the accompanying drawings, it is to be understood that the invention is not limited to those precise embodiments and that various changes and modifications thereof that could be effected by one practiced in the art without departing from the spirit or scope of the novel concepts of the invention as defined in the appended claims.

What is claimed is:

1. In a display system capable of displaying an image presented on a visual output medium, a method for presenting a dynamically changing image, the method comprising repeatedly:
    (a) at least partially dissolving a first edge into an image on the output medium;
    (b) waiting for a delay period after beginning to at least partially dissolve the first edge; and
    (c) after the delay period and while the first edge is only partially dissolved into the image, at least partially dissolving a second edge, distinct from the first edge, into the image,
wherein the lengths of the successive delay periods form a random or pseudo-random sequence of values.

2. The method of claim 1, wherein the display system further comprises a digital image memory for storing a digital representation of an image and wherein at least partially dissolving an edge into the image comprises repeatedly, over a series of time steps starting with a first time step,
    selecting elements from the digital image representation; and
    replacing each selected element with a combination of the element and the corresponding value from a replacement set of image values; wherein:
        the magnitude of the correlation between the elements in the digital image representation and values in the replacement set of image values is greater at the last step than at the first time step.

3. The method of claim 2, wherein step (c) begins, on average, while the first replacement set of image values is no more than about 80% dissolved into the digital image representation.

4. The method of claim 2, wherein, step (a) is performed at a sufficient rate to dissolve at least about ⅔ of the first set of replacement image values in 1 second.

5. The method of claim 2, wherein at each time step, the correlation between elements in the digital image representation and the values in the replacement set of image values is increased.

6. The method of claim 2, wherein the display system has a color map, and further comprising repeatedly:
    cycling the values of the color map.

7. The method of claim 2, wherein the display system has a color map, and further comprising repeatedly:
    selecting a color palette from a set of color palettes; and
    selectively replacing values from the color palette into the color map.

8. The method of claim 2, wherein the step of replacing each selected element comprises:
    replacing each selected element with the value of a linear function of the selected element and the corresponding value from the replacement set of image values.

9. The method of claim 8, wherein the step of selecting elements from the digital image representation comprises:
    selecting most of the elements representing a contiguous area of the image.

10. The method of claim 9, wherein the contiguous area of the image is the entire image.

11. The method of claim 2, wherein the step of replacing each selected element comprises:
    replacing the selected element with the corresponding value from the replacement set of image values.

12. The method of claim 11, wherein the step of selecting elements from the digital image representation comprises randomly selecting elements from the digital image representation not previously selected during the step of at least partially dissolving.

13. The method of claim 1, wherein the visual output medium is a video display.

14. The method of claim 1, wherein the visual output medium is a medium for recording video images.

15. The method of claim 1, wherein the average delay period is greater than approximately 5 milliseconds and less than approximately 60 seconds.

16. The method of claim 1, wherein a representation of the image is stored in a digital array.

17. A system for generating animations comprising:
    a central processing unit;
    an image memory; and
    a video output medium operatively connected to the image memory to display images contained in the image memory, wherein the central processing unit is programmed to repeatedly:
  (a) at least partially dissolve a first edge, into an image displayed on the video output medium;
  (b) wait for a delay period after beginning to at least partially dissolve the first edge; and
  (c) after the delay period and while the first edge is only partially dissolved into the image, at least partially dissolve a second edge, distinct from the first edge, into the image, wherein the lengths of the successive delay periods form a random or pseudo-random sequence of values.

18. A computer program, residing on a computer-readable medium, for generating animations, comprising instructions for causing the computer having a video output medium to:
  (a) at least partially dissolve a first edge, into an image displayed on the video output medium;
  (b) wait for a delay period after beginning to at least partially dissolve the first edge; and
  (c) after the delay period and while the first edge is only partially dissolved into the image, at least partially dissolve a second edge, distinct from the first edge, into the image, wherein the lengths of the successive delay periods form a random or pseudo-random sequence of values.

19. A system for displaying animations comprising:
  (a) an image memory;
  (b) an output medium operatively connected to the image memory for displaying an image;
  (c) means for:
    i. at least partially dissolving a first edge into an image on the output medium;
    ii. waiting for a delay period after beginning to at least partially dissolve the first edge; and
    iii. after the delay period and while the first edge is only partially dissolved into the image memory, at least partially dissolving a second edge, distinct from the first edge, into the image, wherein the lengths of the successive delay periods form a random or pseudo-random sequence of values.

\* \* \* \* \*